United States Patent [19]

Martin

[11] 4,069,952

[45] Jan. 24, 1978

[54] CONTAINERS FOR NOXIOUS SUBSTANCES

[75] Inventor: Edward Rankine Martin, Brierley Hill, England

[73] Assignee: Judge International Limited, Brierley Hill, England

[21] Appl. No.: 732,385

[22] Filed: Oct. 14, 1976

[30] Foreign Application Priority Data

Oct. 22, 1975 United Kingdom ............... 43421/75

[51] Int. Cl.² .......................... B67D 3/00; B67D 5/06; E03D 1/16; E03D 1/06

[52] U.S. Cl. .......................................... 222/510; 4/323

[58] Field of Search ....................... 4/1, 30, 26, 18, 31, 4/17, 16, 19, 20, 67 R, 52; 222/509, 501, 510

[56] References Cited

U.S. PATENT DOCUMENTS

| 584,900 | 6/1897 | Scott | 222/510 X |
|---|---|---|---|
| 617,490 | 1/1899 | Lawton | 222/510 X |
| 797,695 | 8/1905 | Lendh | 4/26 |
| 897,729 | 1/1908 | Foreman | 222/510 X |
| 1,318,518 | 10/1919 | Werner | 4/26 |
| 1,932,224 | 10/1933 | Mitchell | 4/26 |
| 2,504,262 | 4/1950 | Hartel et al. | 222/510 X |
| 3,501,778 | 3/1970 | Minnicar et al. | 4/10 |
| 3,579,651 | 5/1971 | Russo | 4/10 X |
| 3,758,892 | 9/1973 | Mendez | 4/18 |
| 3,789,432 | 2/1974 | Pozzi | 4/26 |
| 3,813,701 | 6/1974 | Stevens | 4/26 |
| 3,817,489 | 6/1974 | Caron et al. | 4/30 X |

Primary Examiner—Henry K. Artis
Attorney, Agent, or Firm—Browdy and Neimark

[57] ABSTRACT

A container for noxious substances provided with a discharge orifice in its lower wall with a plunger extending through the upper wall of the container and adapted to move from a first position sealing the discharge orifice to a second position retracted to open the discharge orifice to gravity discharge of the contents. At a third position, below the first position, a cap covering the bottom of the discharge orifice is removed by pressure of the plunger.

12 Claims, 3 Drawing Figures

CONTAINERS FOR NOXIOUS SUBSTANCES

BRIEF SUMMARY OF THE INVENTION

THIS INVENTION relates to containers for noxious substances. The cleaning of such containers, e.g. the pans of chemical toilets, by known methods such as top or rear emptying is generally unsatisfactory in that a health hazard arises because the container contents may contact the person handling the container. It is accordingly an object of this invention to provide a container for noxious substances the cleaning of which may be more effectively and hygienically accomplished.

The present invention consists in a container for noxious substances having a chamber formed by upper, lower and side walls and provided in a lower wall thereof with a discharge orifice, a plunger extending within the chamber through the upper wall and means for moving the plunger longitudinally between a first and a second position the plunger in the first position thereof sealing the discharge orifice and in the second position thereof being retracted within the chamber to enable gravity discharge of the chamber contents through the discharge orifice.

Advantageously, the container is a portable container and the discharge orifice provides a bore within one end of which opening into the chamber the plunger engages when in the first position thereof, whilst the other end of the bore cooperates with a closure cap, the plunger being movable from its first position to either the second position thereof or to a third position within the bore adjacent the end thereof engaged by the closure cap, movement of the plunger to the third position thereof effecting removal of the cap from its closure position. It will be appreciated accordingly that the closure cap need never be exposed to the container contents, and except on opening for discharge, the bore is closed both by the plunger and the closure cap with which the bore can be sealingly engaged.

The closure cap preferably has a snap connection with the container wall, means being provided for retaining the cap, during discharge, out of the path of discharge. The retaining means may comprise a hinged connection between the cap and container wall, and means for fastening the cap back.

Advantageously, the closure cap is received in sealing engagement within the end of the bore remote from the chamber, the plunger forming a seal with the bore in the first position and on movement therefrom to the third or projected position.

BRIEF DESCRIPTION OF THE DRAWINGS

The invention will now be described, by way of example, with reference to the accompanying drawings, in which.

DESCRIPTION OF THE PREFERRED EMBODIMENTS

Figure 1:
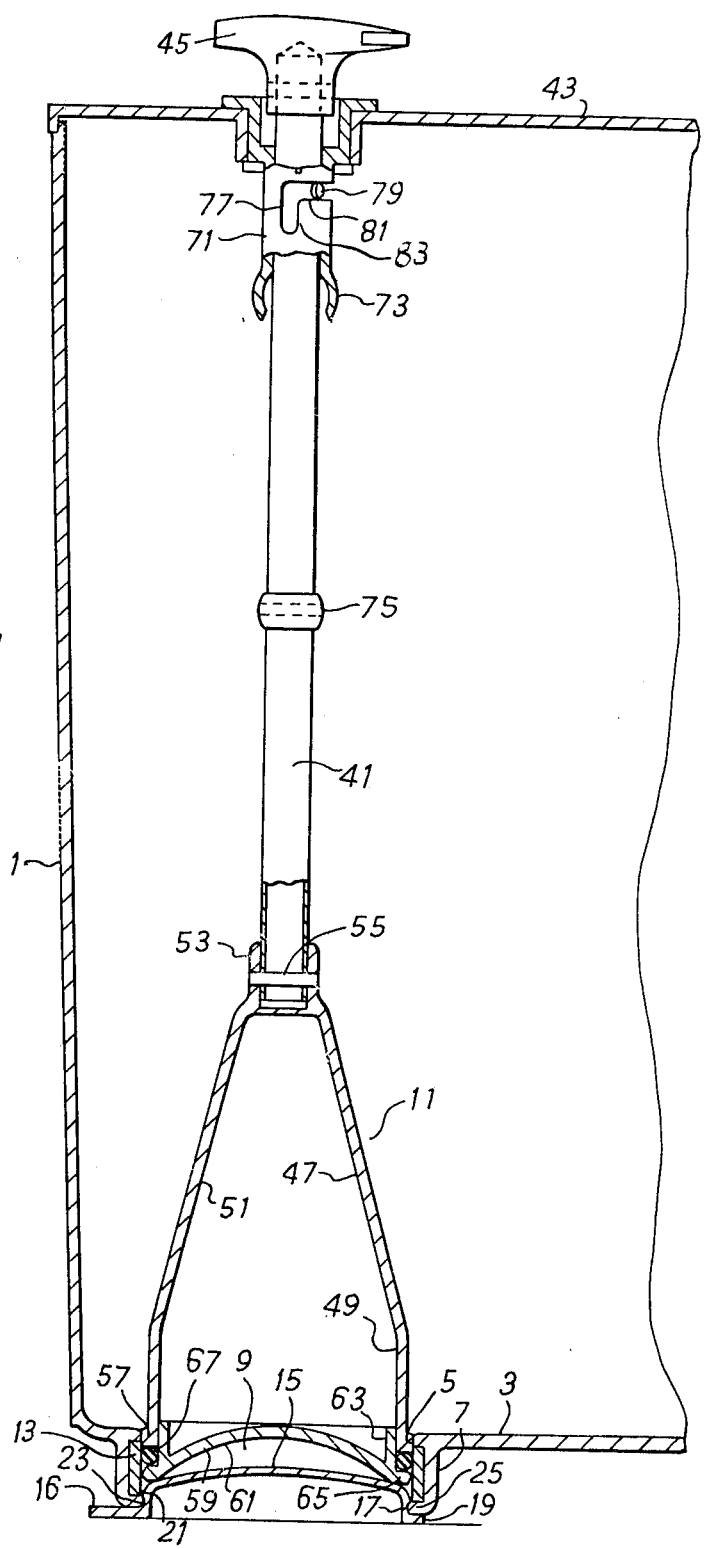
FIG. 1 is a fragmentary sectional view of part of a container for noxious substances according to the invention, in the form of a portable pan for a chemical toilet.
Figure 2:
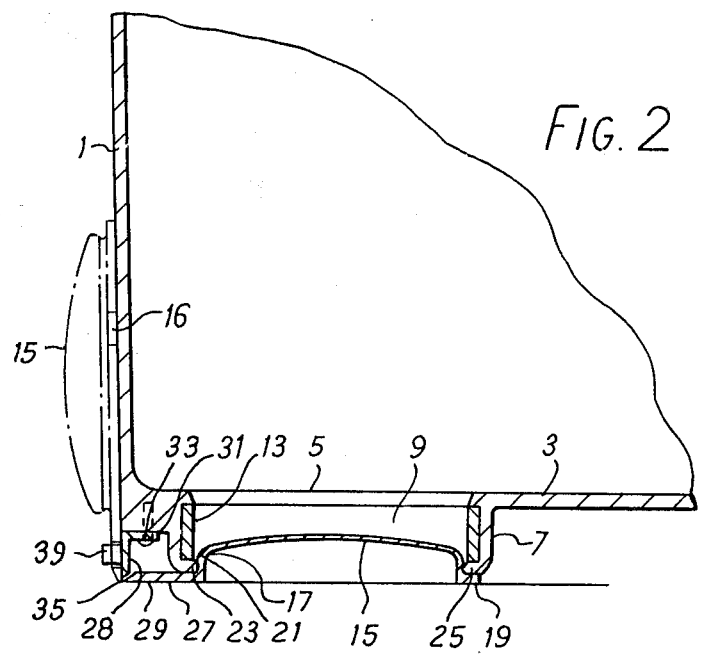
FIG. 2 is a similar fragmentary section of parts of the pan of FIG. 1.
Figure 3:
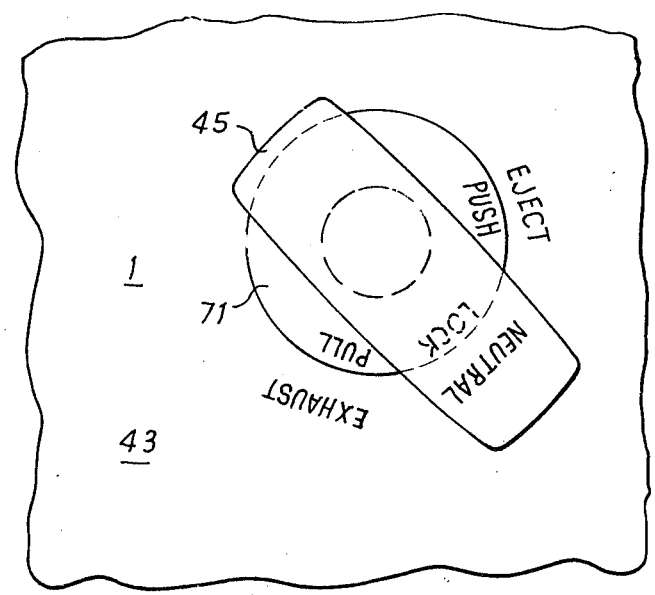
FIG. 3 is a plan view of FIG. 1.

Referring to the drawings an open topped container 1 serving as a portable pan, defined by top, base and side walls, for a chemical toilet has, towards the rear of a base wall 3 thereof, an orifice 5 through which waste may be discharged under gravity. The orifice, which is of circular cross-section, is bounded by a flange 7 depending from the base wall 3, the flange forming a bore 9 for a plunger 11 (described hereinafter) and being provided at its inner face with an annular stainless steel insert 13 flush with that face. The insert 13 forms a rigid liner for the bore. The orifice 5 is closed at the end of the flange remote from the base wall by a closure member in the form of a snap-on cap 15, which comprises a plastics disc which as seen in FIG. 1 is upwardly convex having a wall 17 depending from its edge and at the end of the wall 17 remote from the disc, and perpendicular to the wall, an outwardly extending lip 19. A bead 21 is formed on the cap wall 17 which cooperates with a bead 23 on the container flange 7 to afford the snap-on connection, the lip then resting on an inturned end 25 of container flange 7.

A plastics U-shaped strap 27 extends from the lip 19 of the cap 15 towards the side of the pan, one arm 29 of the strap being connected to the lip whilst another arm 31 of the strap parallel with the arm 27 is fastened to the edge of the base wall 3 by a screw 33 in such a manner that a portion 35 of the strap connecting the arms is flush with the outer upright surface of a side of the container. A hinge 28 is formed in the strap at the junction between the arm 29 extending from the lip and the connecting portion 35, and permits the cap to be pivoted back through 270° to lie against the rear wall. Means are provided for fastening the cap in this position, in the form of a stud 39 extending from the portion 35 connecting the arms of the strap which cooperates with a hole (not shown) in the arm 29 to afford a press-stud connection when the cap 15 is pivoted back. It can thus be retained during discharge of the pan contents out of the path of discharge. A tab 16 is formed on the cap for handling the latter whilst the press stud connection is made and unmade.

A plunger rod 41 of the plunger 11 extends into the container interior through a top wall 43 of the container and has at its upper end a handle 45 and at its lower end a plunger member 47 movable in the bore 9 formed by the container flange 7. The plunger member comprises a cylindrical part 49 at the upper end of which is a part 51 which tapers upwardly and which at its top is formed with a socket 53 in which the lower end of the plunger rod 41 is retained by a pin 55. At its lower end the cylindrical part is formed with a flange 57 and is closed by a crown member 59 comprising a downwardly concave disc 61 having at its rim an upstanding cylindrical portion 63 which is a press fit in the cylindrical part 49 of the plunger member, and an outwardly extending radial flange 65. An O-ring 67 is retained between the flange of the cylindrical part and that of the crown member.

The plunger rod is slidable in a sleeve 71 mounted in the container top wall 43, a clip 73 depending from the lower end of the sleeve and in a retracted position of the plunger retaining a collar 75 on the plunger rod. A slot 77 is formed in the sleeve and engages a peg 79 extending from the plunger rod, thereby to prevent movement of the plunger to a projected or a retracted position except in predetermined angular positions of the plunger handle 45. The slot 77 has a first part 81 extending transversely of the rod axis, in which the peg is movable in an intermediate or neutral position of the plunger to permit rotation of the handle. At one end of the first part a second slot part 83 extends downwardly so that, on rotation of the handle fully in one sense, the handle may be depressed and the plunger thereby moved to its projected position. At the other end of the first part a third slot part (not shown) extends upwardly, and is open at its top, thereby permitting movement of the plunger, on full rotation of the handle in a sense reverse of said one sense, to its retracted position, the third slot part being open at its top to permit the plunger to be retracted beyond the engagement of the peg with the third slot part. It will be seen that to return the plunger after retraction to the intermediate position the handle must first be located in a position in which the peg engages the open end of the slot, and thereafter lowered to the slot part 81.

Before describing the operation of the mechanism certain advantageous features of the construction are worthy of mention. First, the upright side walls of the container project downwardly beyond the bottom wall 3 so that the cap 15 during use is retained in position by the weight of the container. The upwardly convex form of the cap 15 assists the sealing action of the complementary beads 21 and 23 when pressure is applied to the cap to return it to the closed position thereof. The actuating handle 45 being vertically above the orifice 5 enables location of the orifice accurately over a discharge point. Moreover, the handle 45 is located so that the toilet seat (not shown) disposed forwardly of the handle cannot properly be lowered unless the handle is in its neutral position.

In normal use of the toilet which forwardly of the handle 45 is formed with a detachable toilet seat (not shown), the plunger is maintained in the intermediate position, in which the O-ring 67 seals the container bore 9, a further seal being provided by the cap. In this position the handle is maintained intermediate its limits of rotation, with the peg 79 in the first slot part 81, so that the plunger member cannot be moved to the projected or retracted positions. When waste is to be discharged the handle is rotated fully in one sense and lowered so that the plunger moves down the bore and its crown member 59 causes the cap 15 to be forced off the container flange, after which it may be fastened back manually. The maximum projection of the plunger is limited by the length of the second slot part 77. Although the cap has been removed the orifice is still sealed by the plunger member in its projected position. To open the orifice 5 the handle 45 is pulled up to the intermediate position, rotated fully, and then pulled up until the collar 75 on the plunger rod is received in the clip 73, thereby to retain the plunger rod in the retracted position during discharge. After discharge and flushing with fresh water of the container the handle is depressed to the intermediate position and rotated to the position intermediate its limits of rotation, the orifice 5 again being sealed by the plunger. The cap 15 is then replaced manually on the flange.

It will be appreciated that because of the seal afforded by the plunger the cap is not normally exposed to the toilet waste. However, should the seal afforded by the plunger be broken during normal use of the toilet, for example in consequence of inadvertent retraction of the plunger or a defective plunger O-ring, the cap itself serves as a back-up seal which prevents discharge of waste.

As will readily be understood by those skilled in the art many modifications may be made in the embodiment of the invention described without departing from the scope of the invention. Thus, where the container is not required to be portable the flange 7 could have a hose connected thereto and extending to a drain and in this event the cap 15 would be dispensed with and the plunger would only need to be movable between its neutral and retracted positions. The projected position could therefore be eliminated.

As to other modifications the following are mentioned by way of example and are by no means intended as an exhaustive list: the seal 67 could be provided in the insert 13 rather than on the plunger member; the seal between the cap 15 and the flange 7 could be provided at the exterior of the flange, i.e. the cap 15 would fit over rather than within the flange 7; the seal between the cap 15 and the flange 7 could be provided whether on the outside or inside of the flange 7 by an O-ring instead of the complementary beads described; the clip 73 and the collar 75 could be of any other suitable form to retain the plunger in the retracted position.

We claim:

1. A portable container for noxious substances comprising a chamber formed by upper, lower and side walls, a discharge orifice provided in the lower wall and in the form of a bore having a lower end and an upper end which opens into the chamber, a closure cap in sealing engagement with the lower end of the bore, a plunger extending within the chamber through the upper wall and means for moving the plunger longitudinally between first, second and third positions, the plunger in the first position thereof being disposed within and sealing the bore and being movable from its first position to either the second position in which the plunger is retracted within the chamber to enable gravity discharge of the contents of the chamber through the discharge orifice, or the third position located within the bore adjacent the end thereof engaged by the closure cap, movement of the plunger to the third position thereof effecting removal of the cap from its closure position.

2. A container as claimed in claim 1, wherein means are provided for retaining the cap, during gravity discharge of the container contents, out of the path of discharge.

3. A container as claimed in claim 2, wherein the retaining means comprise a hinged connection between the cap and the container to enable rotation of the cap to a position out of the discharge path and fastening means for securing the cap to the container in said position of the cap out of the discharge path.

4. A container as claimed in claim 3, wherein the fastening means comprise a snap fastener having complementary elements respectively on the container and the cap and adapted to hold the cap against a side of the container.

5. A container as claimed in claim 1, wherein the cap has a snap fastening connection with the bore and is convex as viewed from the container end of the bore.

6. A container as claimed in claim 1, wherein the closure cap is received in sealing engagement within the end of the bore remote from the chamber and the plunger forms a seal with the bore in the first position and during movement to the third position thereof.

7. A container as claimed in claim 1, wherein the plunger member comprises a plunger member engaged in the first and third positions of the plunger within the bore and a plunger rod which slidingly engages within a sleeve mounted in the chamber upper wall.

8. A container as claimed in claim 7, wherein the plunger rod is slidingly and rotatably supported in the sleeve and provided with an operating handle and the sleeve is formed with a slot within which is engaged a peg secured to the plunger rod, the slot having transversely extending section and at respective opposite ends thereof longitudinally downwardly and upwardly extending sections, the engagement of the peg in the transverse slot section corresponding with the first position of the plunger whilst the engagement of the peg with the ends of the downwardly and upwardly extending slot sections remote from the transverse slot section corresponds respectively with the third and second plunger positions.

9. A container as claimed in claim 8, wherein the plunger rod and the sleeve are formed with respective complementary elements of a clip for retaining the plunger in the second position thereof.

10. A container as claimed in claim 1, wherein the container is formed from plastics material and the bore is provided with a rigid metal liner.

11. A container as claimed in claim 1, wherein the container comprises a portable chemical toilet pan.

12. A container as claimed in claim 1, wherein the length of the bore is dimensioned in relation to the container side walls so that in operative position of the container the closure cap is retained in position by the weight of the container.

* * * * *